US006137895A

United States Patent [19]

Al-Sheikh

[11] Patent Number: 6,137,895

[45] **Date of Patent: *Oct. 24, 2000**

[54] METHOD FOR VERIFYING THE IDENTITY OF A PASSENGER

[76] Inventor: Zaher Al-Sheikh, 33252 Breckenridge Dr., Sterling Heights, Mich. 48310

[ * ] Notice: This patent issued on a continued prosecution application filed under 37 CFR 1.53(d), and is subject to the twenty year patent term provisions of 35 U.S.C. 154(a)(2).

[21] Appl. No.: 09/016,099

[22] Filed: Jan. 30, 1998

Related U.S. Application Data

[60] Provisional application No. 60/060,817, Oct. 1, 1997.

[51] Int. Cl.[7] .............................. G06K 9/00; G07B 15/02

[52] U.S. Cl. .............................................. 382/115; 235/384

[58] Field of Search ..................................... 382/115, 118, 382/100; 235/384, 375, 376; 364/607, 401, 463; 283/86, 77, 93

[56] References Cited

U.S. PATENT DOCUMENTS

| | | | |
|---|---|---|---|
| 3,258,277 | 6/1966 | Schuster | 282/22 |
| 3,671,059 | 6/1972 | Zeller | 283/7 |
| 3,755,935 | 9/1973 | Annenberg | 40/2.2 |
| 3,758,970 | 9/1973 | Annenberg | 40/2.2 |
| 4,001,073 | 1/1977 | Jones et al. | 156/516 |
| 4,094,719 | 6/1978 | Jones et al. | 156/250 |
| 4,507,166 | 3/1985 | Posner | 156/235 |
| 4,711,994 | 12/1987 | Greenberg | 235/384 |
| 4,865,351 | 9/1989 | Smithson et al. | 283/58 |
| 5,051,565 | 9/1991 | Wolfram | 235/384 |
| 5,139,847 | 8/1992 | Breen | 428/40 |
| 5,272,025 | 12/1993 | Wheeler | 430/14 |
| 5,421,619 | 6/1995 | Dyball | 283/86 |
| 5,505,494 | 4/1996 | Belluci et al. | 283/75 |
| 5,606,365 | 2/1997 | Maurinus et al. | 348/222 |

OTHER PUBLICATIONS

Microsoft User's Guide, p. 370, Copyright 1994.

Microsoft Office User's Guide, pp. 339–340, 365–366, 525 and 542–543, Copyright 1994.

*Primary Examiner*—Jose L. Couso

*Assistant Examiner*—Duy M. Dang

*Attorney, Agent, or Firm*—Gifford, Krass, Groh, Sprinkle, Anderson & Citkowski, P.C.

[57] ABSTRACT

A conveyance boarding pass includes a human cognizable image of a passenger as well as the travel itinerary details. The human cognizable image is collected using a device capable of generating an electronic image at a time when the identification of the passenger is verified. Upon presenting the boarding pass the identity of the bearer is checked against the human cognizable image on the boarding pass to maintain the security of the transport system. The electronic image optionally is stored in a computer database in combination with the travel itinerary details for further security and other uses.

16 Claims, 2 Drawing Sheets

METHOD FOR VERIFYING THE IDENTITY OF A PASSENGER

RELATED APPLICATION

This application claims priority of U.S. Provisional Patent Application 60/060,817 filed Oct. 1, 1997 and is incorporated herein by reference.

FIELD OF THE INVENTION

This invention relates to a method for verifying the identity of a passenger, more particularly the invention involves printing a human cognizable image of the passenger on a conveyance ticket so as to facilitate rapid and repeated security verification.

BACKGROUND OF THE INVENTION

Concerns over the ever-increasing sophistication of terrorism and drug trafficking have prompted transportation networks to utilize increased security procedures, in order to keep pace. Traditional security protocols dictate heightened security perimeters surrounding sensitive areas, as one approaches those areas. For example, the sensitive area of an airport is the aircraft itself. While runways and secure aircraft service areas are protected by a badge and uniform system by which only authorized personnel are permitted access to various secure areas, this system is not amenable to controlling aircraft access by passengers. Current security doctrine involves allowing access to airport terminals to the public upon passing a metal detector screening. Upon presenting a ticket and perhaps a form of photo-identification, a passenger is issued a boarding pass which designates the flight particulars of the passenger. The issuance of a boarding pass may occur on either side of the metal detection screening. The present system fails in that there are no means available to verify whether the passenger presenting a boarding pass upon gaining access to the aircraft, is in fact the passenger of record. In this way, the secure nature of the aircraft to only authorized passengers is compromised.

The weaknesses of the conventional security systems in regard to the presentation of a boarding pass by a person other than the passenger of record are not practically solved with existing methods. The addition of a passenger identification checkpoint using picture identification at the point of gateway embarkation is not feasible, owing to the time-consuming nature of a checkpoint. A checkpoint procedure under ideal conditions requires about thirty seconds per passenger and results in delays in loading the aircraft. This process is further slowed by passengers fumbling for picture identification stored in baggage, purses, wallets and the like. Thus, there exists a need for a method of verifying a passenger's identity at the time of boarding the transport that does not involve the use of a separate piece of picture identification.

Security at airports, passenger ships, train and bus stations, as well as other central transportation sites is a concern for all who utilize conveyances such as airplanes, trains and buses. Various systems are utilized to verify the identity of a passenger prior to boarding such a conveyance. For example, the identity of the passenger is typically verified at the time the ticket is purchased, at the time the boarding pass is issued or during passenger check-in. Because the identity of a passenger is not typically verified after the purchase of the ticket or after the issuance of the boarding pass, there is an opportunity for a ticket purchased by one passenger to be utilized by another passenger. Thus, there remains a need for a simple system which will permit the verification of the identity of a passenger at the time of boarding the particular conveyance.

SUMMARY OF THE PRESENT INVENTION

The present invention satisfies this need by providing a method for verifying the identity of a passenger at the time of boarding. The method includes the steps of initially verifying the identity of a passenger prior to the time of boarding. For example, the identity of the passenger may be verified at the travel agent or airline counter when the ticket is purchased and travel arrangements are made. Alternately, the identity of the passenger may be verified upon check-in at the transportation site. Next, a photographic image of the passenger who has purchased the ticket is taken with a device capable of generating and outputting an electronic image. The photographic image is taken in a manner that prevents the passenger from changing places with another person following identity verification. A variety of digital cameras are available which enable an electronic image to be taken of an individual and which output an electronic image. Illustratively, devices capable of generating an electronic image include charged coupled device (CCD) arrays and video analog camera/video frame grabber systems. It is appreciated that a relatively low quality image is sufficient for operation of the instant invention. For instance a 256 gray scale image renders comparison possible without consuming undue computer storage space. Higher quality images including color are also operative herein.

DETAILED DESCRIPTION OF THE INVENTION

The instant invention is discussed herein in reference to passenger aircraft transportation, not as a means of limitation, but rather is intended to be exemplary of the invention utility. One skilled in the art will readily appreciate the applicability of the instant invention to passenger identification in the transportation contexts illustratively including: cruise ships, ski-lifts, rail- and bus-lines.

Figure 2:
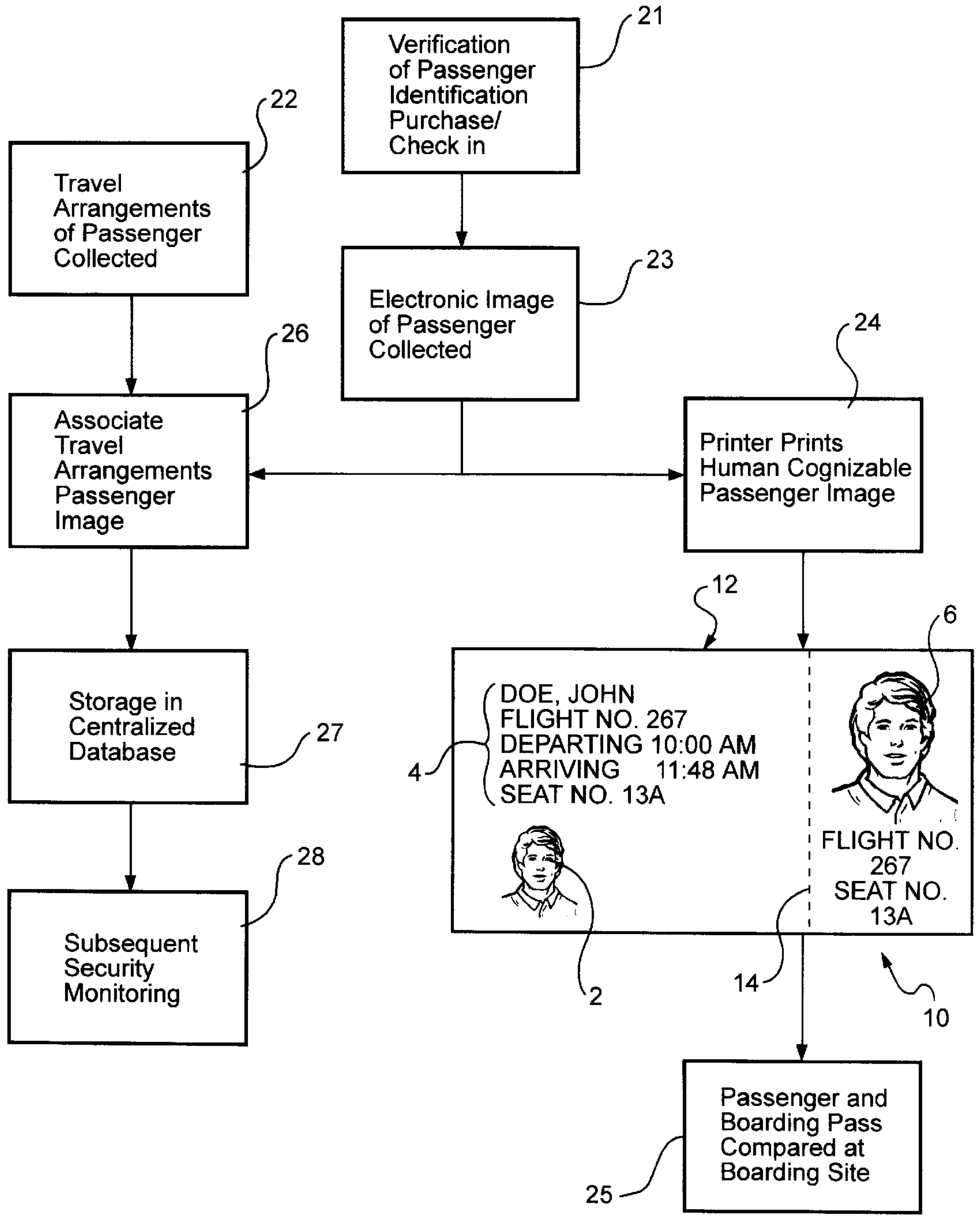
FIG. 2 depicts a flow chart of operative steps of an embodiment of the instant invention for verifying the identity of a passenger through the printing of a human cognizable image on a boarding pass.

Upon purchase of a conveyance ticket or at the time travel arrangements are made, the identity of the passenger is verified 21 and an electronic image of the purchasing passenger is taken, with a device capable of generating an electronic image 23 of FIG. 2. Alternatively, the passenger identity is verified upon check in at the transportation site. Illustratively, devices capable of generating an electronic image include charged coupled device (CCD) arrays and video analog camera/video frame grabber systems.

Figure 1:
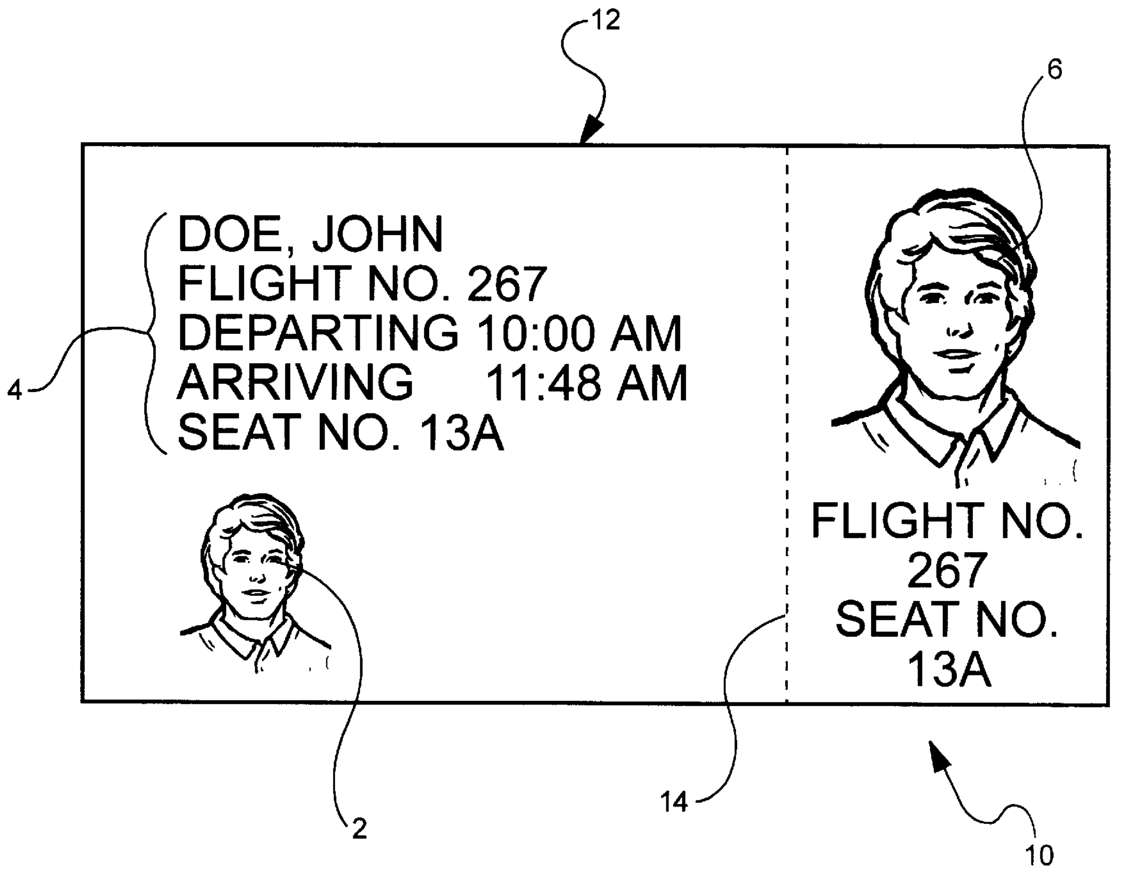
FIG. 1 depicts an embodiment of a conveyance ticket of the instant invention.

The electronic image is input to a printer which prints a human-cognizable image of the passenger 24 onto a boarding pass 10 which is depicted in FIG. 1. Any dissimilarity between the person requesting a boarding pass and the passenger of record thus becomes obvious to the issuing agent by visual comparison of the printed image 2 and the person requesting the pass. Upon a passenger presenting a conveyance ticket, a boarding pass of the instant invention is then issued. Owing to relatively low quality of the image 2, such as a 256 gray scale image, the printing of the human cognizable image does not significantly decrease the speed at which an agent distributes passes. It is appreciated that a higher quality image in terms of gray scale tones or color is also operative herein. Preferably, the information on the travel itinerary 4 of the passenger is also printed onto the boarding pass at this time, although the electronic image may be printed onto a boarding pass already containing such information. It is further appreciated that a conveyance ticket itself is amenable to use a substrate for the printing of a human cognizable image of the instant invention, especially in instances where a boarding pass separate from the ticket is not issued.

An additional human-cognizable image 6 may be printed on the boarding pass, thus enabling an image to be printed on passes having several separable portions. The retention of a portion of the pass having the passenger's image thereon optionally allows for additional verification stages following boarding.

The boarding pass substrate 12 is generally composed of a semi-rigid rectilinear portion of paper or cardboard. Preferably, the substrate 12 has a perforation line 14 transecting the substrate. The substrate being printed with a blank conveyance form (not shown). The form is formatted to accept individualized travel itinerary details 4 of the passenger within blank sections thereof The individualized travel details illustratively including: passenger name, passenger destination, transport designation, departure time, arrival time, seat assignment, travel class, transport tariff and the like. In particular to aircraft transport the details may include flight number and meal selection information. A portion of the blank form being open for the printing of the human cognizable image of the passenger.

The passenger then proceeds to the boarding site with the boarding pass. At the time of boarding, or upon arrival at the boarding site, the human-cognizable image on the boarding pass is compared with the passenger presenting the boarding pass 25 to ensure that the passenger who purchased the ticket is the same passenger who is boarding the conveyance.

The security of the transport is enhanced by passenger verification occurring at the time of boarding. The identity verification method of the instant invention is considerably quicker than that using picture identification because the verifying agent merely glances at the face of the passenger and their presented boarding pass.

In a preferred embodiment, the electronic image of the passenger is associated with the travel arrangements of the passenger 26 and stored in a centralized database 27. The database storage of a passenger image with travel arrangements provides for subsequent security monitoring 28 and for the tracking of criminal suspects traveling with counterfeit identification. Furthermore, image data coupled with travel itinerary data is optionally utilized outside of a security setting to provide demographic passenger information, for targeting transport promotional offers, and verification of non-transference of special fares and benefits extended to particular passengers.

In an alternative embodiment, the human-cognizable electronic image, and other individualized travel details, illustratively including: passenger name, passenger destination, departure time, arrival time, seat assignment, travel class, transport tariff, et al., are tied electronically to a unique alphanumeric code, printable in alphanumeric and in bar code format.

All pertinent text-based individualized travel details then are printed upon the boarding pass, along with the unique alphanumeric code, in alphanumeric and bar code format. Upon boarding, or at any other prior or subsequent security checkpoint, the bar code is read with a bar code scanner, which then causes the individualized travel details to be referenced, and the human-cognizable digital image to be displayed upon a video screen interfaced with the bar code scanner at the security checkpoint. This image is then compared with the individual presenting the boarding pass.

The unique alphanumeric code also is provided in alphanumeric format to enable manual entry of the code in the event of difficulty reading the printed bar code. It is appreciated that the alphanumeric and bar code formatted information is optionally printed in duplicate on separable portions of the boarding pass.

In still another embodiment, the camera taking the image of the passenger may directly apply the image to the boarding pass by using either photosensitive material in at least a portion of the boarding pass in a Polaroid-type system or by directly transferring the electronic image created by a digital camera to the boarding pass.

One skilled in the art will readily appreciate that the present invention is well adapted to carry out the objects and provide the applications mentioned, as well as those inherent therein. Modifications and variations within the spirit of the invention will occur to those skilled in the art. Such modifications are also intended to fall within the scope of the appended claims.

What is claimed is:

1. A method for encoding an aircraft boarding pass with an image of a passenger to facilitate identity verification of the passenger at the time of aircraft boarding, comprising the steps of:

verifying the identity of the passenger prior to the boarding of the said aircraft and at a location beyond a security perimeter surrounding said aircraft;

taking an electronic image of the passenger with a camera capable of generating a computer-storable image output;

associating said computer-storable image output with individualized travel itinerary details of the passenger, said details comprising passenger name, passenger destination, aircraft flight number, aircraft departure time and passenger seat assignment;

printing a human-cognizable image of the passenger directly onto a boarding pass, the boarding pass comprising: a self-supporting substrate having a detachable perforation line transecting said substrate; a blank conveyance form printed on said substrate, said form having an open section, and blank sections proportioned for individualized travel itinerary details of the passenger; and said image of the passenger printed in the open section of said form; and comparing the human-cognizable image on said boarding pass with the passenger presenting said boarding pass at the tire of boarding of said aircraft and at a location within said security perimeter isolating said aircraft.

2. The method of claim 1 further comprising the step of: printing a second human-cognizable image of the passenger onto said boarding pass such that the perforation line is between said human-cognizable image and said second human cognizable image.

3. The method of claim 2 further including the step of: dividing said substrate along the perforation line into a plurality of portions, each of the plurality of portions having printed thereon individualized travel itinerary details of the passenger comprising: passenger name, passenger destination, and passenger seat assignment.

4. The method of claim 1 further comprising the step of: retrieving, in combination, said itinerary details and said computer-storable image output from a computer database in which said details and said output are stored.

5. A travel boarding pass for verifying the identity of the bearer, the boarding pass comprising:

a self-supporting substrate having a detachable perforation line transecting said substrate;

a blank conveyance form printed on said substrate, said form having an open section, and blank sections proportioned for printing individualized travel itinerary details of the passenger; and a human cognizable image of the passenger printed in the open section of said form wherein said image is in electronic representation, printed directly onto said substrate.

6. The boarding pass of claim 5 further comprising a second image of the bearer such that the perforation line is between said image and said second image.

7. The boarding pass of claim 6 wherein said substrate is divisible along the perforation line into a plurality of portions, each of the plurality of portions having printed thereon individualized conveyance details of the bearer including the bearer name, destination, departure time, and seat assignment.

8. The boarding pass of claim 5 wherein said boarding pass is accepted for aircraft travel.

9. The boarding pass of claim 5 wherein said boarding pass is accepted for cruise ship travel.

10. The boarding pass of claim 5 wherein said boarding pass is accepted for ski-lift travel.

11. The boarding pass of claim 5 wherein said boarding pass is accepted for rail travel.

12. The boarding pass of claim 5 wherein said boarding pass is accepted for bus travel.

13. The boarding pass of claim 5 further comprising a database from which said itinerary details in said human-cognizable image of the bearer are retrievable in combination.

14. A method for encoding an aircraft boarding pass with an image of a passenger to facilitate identity verification of the passenger at the time of aircraft boarding, comprising the steps of:

verifying the identity of the passenger prior to the boarding of the said aircraft and at a location beyond a security perimeter surrounding said aircraft;

taking an electronic image of the passenger with a camera capable of generating a computer-storable image output;

associating said compute-storable image output with individualized travel itinerary details of the passenger;

printing a bar code onto a boarding pass, said bar code referencing said computer-storable image output within a computer, the boarding pass comprising: a self-supporting substrate having a detachable perforation line transecting said substrate; a blank conveyance form printed on said substrate, said form having an open section, and blank sections proportioned for individualized travel itinerary details of the passenger; and said bar code printed in the open section of said form;

reading said bar code with a bar code scanner to said computer database;

recalling a human-cognizable image of the passenger from said computer-storable image output, said computer-storable image output referenced to said bar code with said computer database;

displaying said human-cognizable image on a monitor interfaced with said computer database; and comparing the human-cognizable image on said monitor with the passenger presenting said boarding pass at the time of boarding of said aircraft and at a location within said security perimeter isolating said aircraft.

15. The method of claim 14 further comprising the step of: printing a second bar code referencing said computer-storable image onto said boarding pass such that the perforation line is between said bar code and said second bar code.

16. The method of claim 14 further comprising the step of: retrieving, in combination, said itinerary details and said computer-storable image output from said computer database in which said details and said output are stored.

* * * * *